United States Patent [19]

Meadows et al.

[11] Patent Number: 5,326,656
[45] Date of Patent: Jul. 5, 1994

[54] BIPOLAR BATTERY ELECTRODE

[75] Inventors: Clarence A. Meadows, Muncie; Robert E. Adams, Selma; James R. Bish, Anderson, all of Ind.

[73] Assignee: General Motors Corporation, Detroit, Mich.

[21] Appl. No.: 79,029

[22] Filed: Jun. 21, 1993

[51] Int. Cl.$^5$ .................. H01M 10/18; H01M 4/72
[52] U.S. Cl. ................... 429/178; 429/210; 429/234; 429/246
[58] Field of Search ............. 429/210, 178, 234, 247, 429/246

[56] References Cited

U.S. PATENT DOCUMENTS

| 2,471,781 | 5/1949 | Schmidt | 136/12 |
| 3,728,158 | 4/1973 | Poe et al. | 136/10 |
| 3,738,871 | 6/1973 | Scholle | 429/234 |
| 4,098,967 | 7/1978 | Biddick et al. | 429/210 |
| 4,178,216 | 12/1979 | Nordblom et al. | 204/2.1 |
| 4,237,205 | 12/1980 | Matter | 429/234 |
| 4,275,130 | 6/1981 | Rippel et al. | 429/144 |
| 4,658,499 | 4/1987 | Rowlette | 29/623.1 |

OTHER PUBLICATIONS

W. E. Rippel, "Bipolar Battery Using Conductive-Fiber Composite", NASA Tech Briefs, pp. 20, 22, Feb. 1989.

Primary Examiner—John S. Maples
Attorney, Agent, or Firm—Lawrence B. Plant

[57] ABSTRACT

A bipolar battery comprising a plurality of bipolar electrodes stacked together, each bipolar electrode comprising a conductive septum having positive and negative active material on opposite faces thereof. Each electrode has a nonconductive frame formed thereabout, and a mesa-like lattice which is integral with the frame, overlays the faces of the septum and is defined by an annular shoulder formed between the border of the lattice and the frame. Discrete spacer frames interjacent the electrode frames separate the electrodes from each other and define a region thereabout for retaining the battery's electrolyte. The faces of the spacer include an annular recess contiguous an inner rim thereof which receives, in nesting fashion, the mesa-like lattices for interlocking the several frames together.

9 Claims, 5 Drawing Sheets

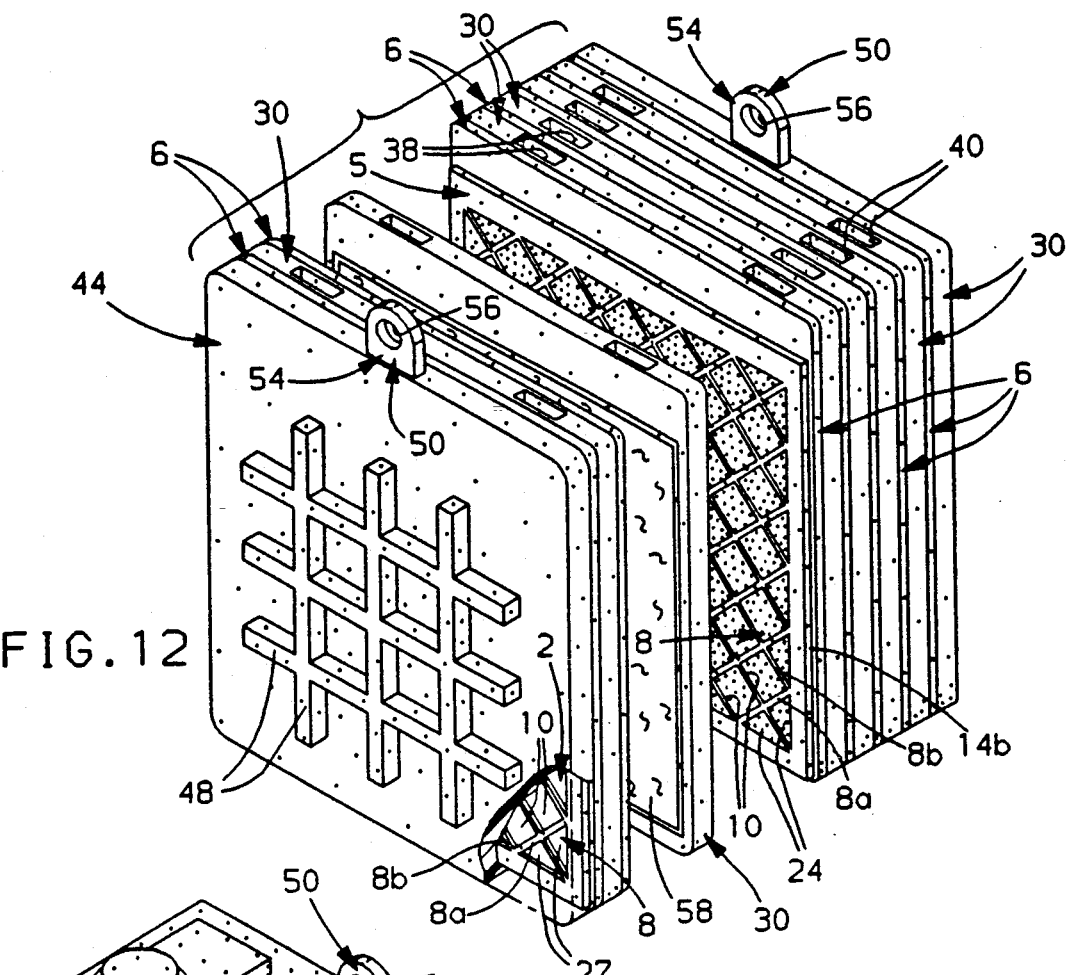
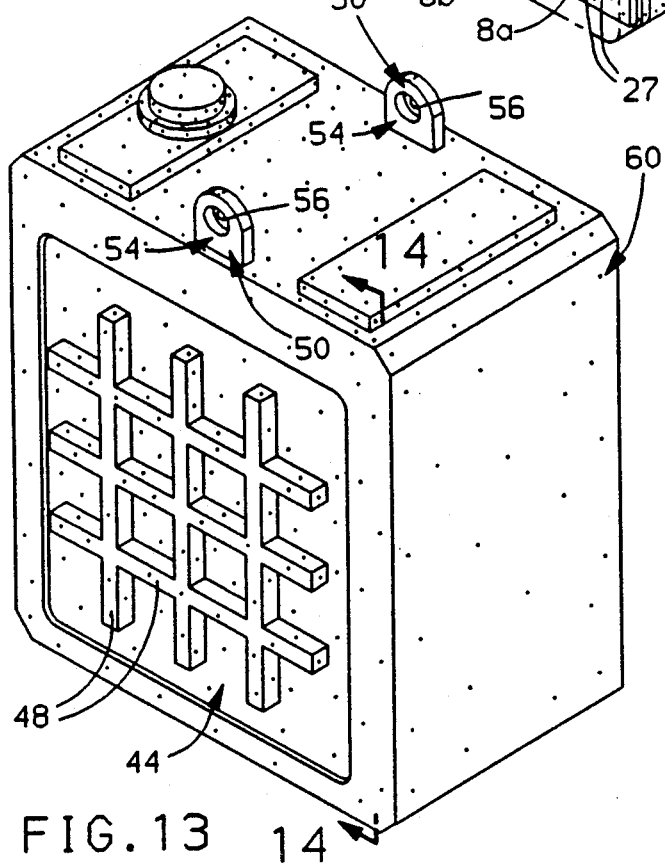
FIG. 12
FIG. 13

BIPOLAR BATTERY ELECTRODE

This invention relates to bipolar electric storage batteries of the face-to-face electrode type, and more particularly to a unique packaging arrangement therefor.

BACKGROUND OF THE INVENTION

Bipolar batteries employ either one of two types of bipolar electrodes, i.e., face-to-face or side-by-side. Face-to-face type bipolar electrodes, utilize an electrolyte resistant, impervious, substantially planar conductive septum having a first polarity active material on one face thereof and an opposite polarity active material on the opposite face thereof. The bipolar electrodes are mounted in nonconductive frames and stacked together such that opposite polarity faces of adjacent bipolar electrodes oppose each other across an electrolyte-filled gap which also contains an electrolyte-permeable, dendrite-suppressing separator (e.g., microporous polyethylene, glass mat, microporous PVC, etc.). The frames are typically either clamped or adhesively secured together. One such battery is exemplified by the patent to Poe et al U.S. Pat. No. 3,728,158, assigned to the assignee of the present invention.

It is known for the electrically conductive septum that separates the opposite polarity active materials of the bipolar electrode to comprise either (1) a thin metal plate (e.g., lead in the case of a Pb-acid battery), (2) an electrically conductive polymer, or (3) a nonconductive polymer having a plurality of rivet-like conductors embedded therein for electrically communicating one face of the septum to the other. For a number of reasons, the use of solid metal plates is preferred for long-lived, high power, bipolar batteries. A metal plate septum particularly useful for lead acid batteries is described in copending U.S. patent application Ser. No. 079,030 filed Jun. 21, 1993 and assigned to the assignee of the present invention. Other metal or conductive septums are useful with other types of battery systems (e.g., alkaline batteries) as is well known in the art. Two of the problems associated with the commercialization of face-to-face type bipolar batteries are (1) insuring that the active material remains in contact with the septum throughout the life of the battery, and (2) manufacturing problems associated with the handling, alignment, assembly and reliable sealing of so many individual components to form the finished battery.

It is an object of the present invention to provide a unique bipolar battery packaging arrangement for face-to-face type bipolar batteries which addresses both the aforesaid problems by providing a conductive septum engaged on its perimeter by a nonconductive frame, and having mesa-like lattices which (1) are integral with the frame inboard its periphery, (2) provide a plurality of active-material-retaining-pockets across the faces of the septum, and (3) are designed and constructed to securely nest within spacer frames positioned between adjacent bipolar electrodes. This and other objects and advantages of the present invention will become more readily apparent from the detailed description thereof which follows.

BRIEF DESCRIPTION OF THE INVENTION

As a preferred application of the present invention involves Pb-acid storage batteries, the invention will be described in terms thereof, though it is not limited to such batteries. In a Pb-acid bipolar battery, the bipolar electrode comprises a lead plate septum having an adherent, porous coating on at least one face (preferably both faces) thereof for securely anchoring a leady active material thereto. The coating comprises multiple layers of arc-sprayed, lead particles fused to each other, and to the face of the septum, providing a plurality of interconnecting, interstitial pores for anchoring a leady active material (i.e., Pb, PbO, $PbO_2$, etc.) to the septum [see U.S. Ser. No. 079,030]. The bipolar electrodes are mounted in nonconductive frames, have nonconductive lattices overlaying the faces thereof and stacked together with spacer frames and monopolar electrodes (i.e., at the ends of the stack) to form a complete bipolar battery. The several frames nest within each other.

More specifically, in accordance with the present invention, there is provided a bipolar battery comprising a stack of bipolar electrodes sandwiched between a pair of monopolar electrodes wherein each bipolar electrode is engaged on its periphery by a nonconductive frame. Each electrode includes a conductive septum dividing the opposite polarity faces one from the other. A pair of nonconductive lattices integral with the frame, and inboard the periphery thereof, overlay the faces of the septum so as to provide a plurality of pockets extending across the septum faces for receiving and retaining the battery's active materials. The lattices are mesa-like in character in that they stand in relief above the opposing faces of the frame and define a shoulder with the frame which shoulder circumscribes the lattice. After the pockets are filled with appropriate active material, the several framed electrodes are stacked together face-to-face with opposite polarity active material on adjacent electrodes opposing one another across an electrolyte retention region therebetween. The electrolyte retention region between adjacent electrodes is defined by a discrete spacer frame sandwiched between adjacent bipolar electrodes. The spacer frame has an internal rim defining a central electrolyte-retention region between adjacent electrodes and a pair of faces on opposite sides thereof abutting the electrode frames. An annular recess is provided in each of the spacer frame's faces contiguous the rim and receives the shoulder surrounding the mesa-like lattice in a nesting relationship. The several nestable frames may be sealed one to the other to form the outer housing/casing of the battery, or will preferably be embedded in a polymeric (e.g., thermoplastic or thermoset polymer) housing/casing molded in situ thereabout as described in more detail in U.S. patent application Ser. No. 079,033 assigned to the assignee of the present invention and filed Jun. 21, 1993.

Each spacer frame contains at least one opening through one of its legs for admitting electrolyte into the electrolyte-retention region and/or for venting the cell of any gases generated therein. The monopolar electrodes in the end cells will preferably each comprise one of the bipolar electrodes having active material applied to only one face thereof. The battery's terminal will preferably be molded into the end wall of the battery and contain tangs projecting therefrom into contact with the unpasted face of the bipolar electrode serving as a monopolar electrode. The tangs are preferably induction welded to the septum of the monopolar electrode after the battery has been assembled.

DETAILED DESCRIPTION OF SPECIFIC EMBODIMENTS

The invention will be better understood when considered in the light of the following detailed description of a specific, preferred embodiment thereof which is given hereafter in conjunction with the several figures wherein:

FIG. 12 is an exploded view of a bipolar battery stack;

FIG. 13 is a perspective view of a bipolar battery in a separate housing; and

Figure 1:
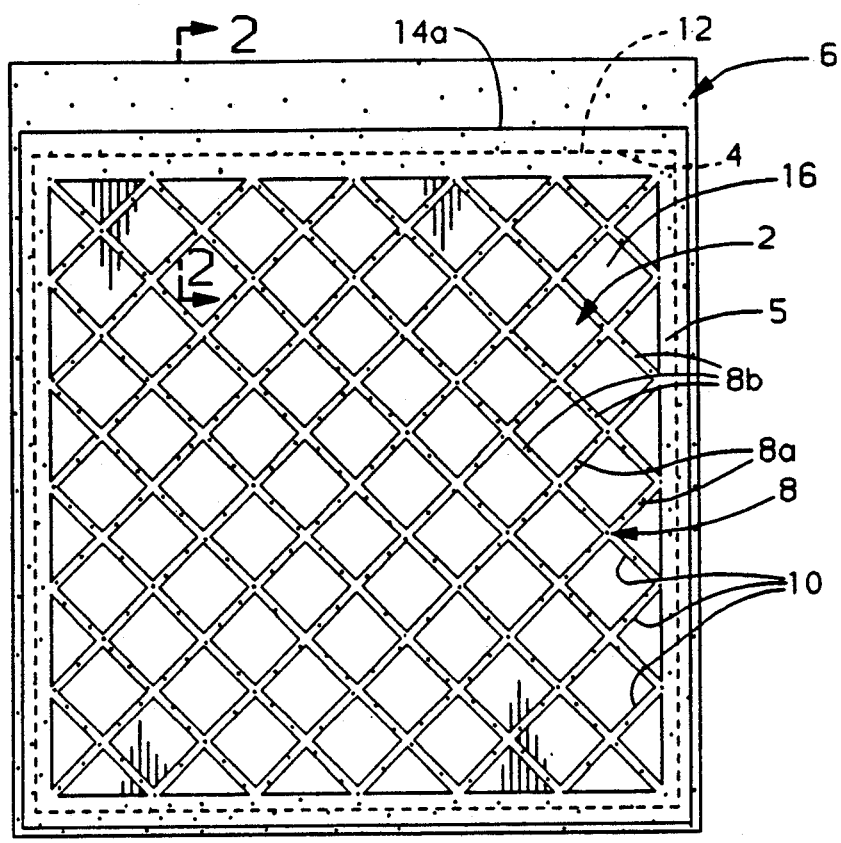
FIG. 1 is a front, elevational view of a bipolar electrode in accordance with the present invention.
Figure 2:
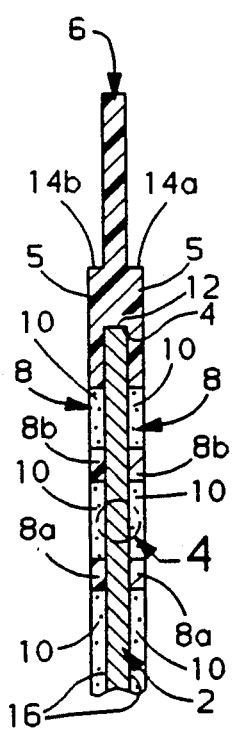
FIG. 2 is a sectioned, side elevational view in the direction 2—2 of FIG. 1.
Figure 3A:
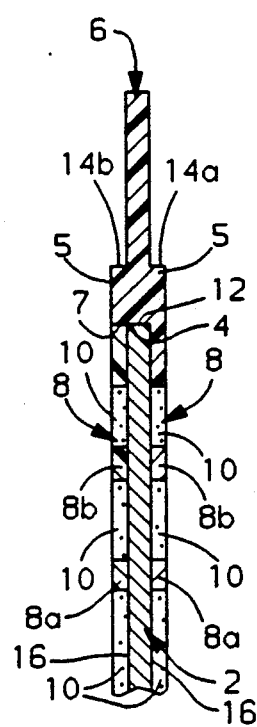
FIGS. 3a, 3b and 3c are views like FIG. 2 of alternative embodiments to the frame and lattice shown in FIG. 2.
Figure 3B:
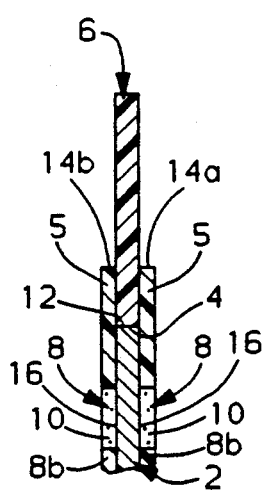
Figure 3C:
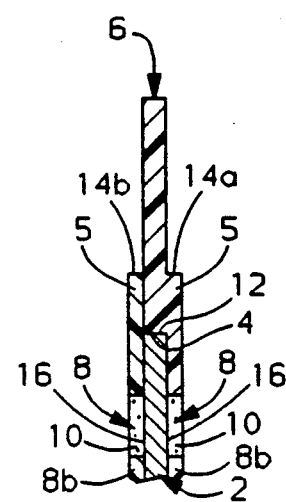
Figure 4:
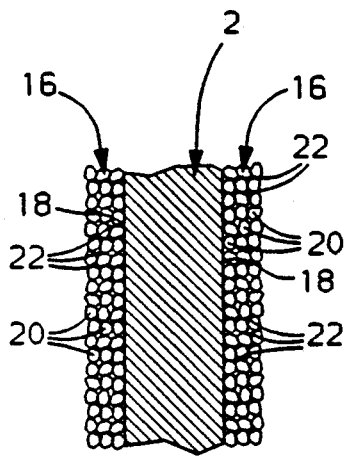
FIG. 4 is a magnified view of the zone 4 of FIG. 2.
Figure 5:
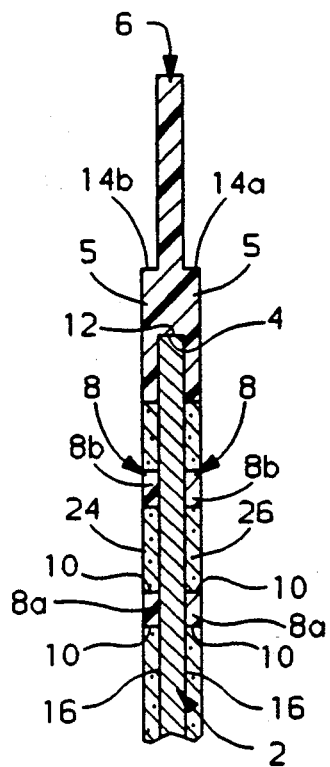
FIG. 5 is a view like that of FIG. 2, but having active material pasted on both sides of the electrode.

FIGS. 1-5 depict a bipolar electrode comprising a lead septum plate 2 encompassed by a nonconductive plastic frame 6 having an inner rim 4 engaging the periphery of the plate 2. The frame 6 is preferably insert molded about the plate 2, by positioning the plate in a mold and molding the frame thereabout. Nonconductive (e.g., polyolefin) lattices 8 comprising a plurality of crisscrossing lattice wires 8a and 8b define a plurality of pockets 10 overlaying the faces on opposite sides of the septum plate 2. As shown in FIG. 2, the lattices 8 may be molded as one piece with the frame 6 such that the border 5 of the lattices 8 are molded with the frame 6 around the edge 12 of the plate 2. Alternatively, and as shown in FIGS. 3a, 3b and 3c, one or both of the lattices 8 may be molded separately from the frame 6 and subsequently made integral therewith by bonding (e.g., heat sealing, ultrasonically bonding or adhesively bonding) thereto. As shown in FIG. 3a, the edge 12 of the plate 2 is coextensive with the edges 7 of borders 5 of the lattices 8, and the frame 6 is then molded thereabout so as to bond to the edges 7 of the lattices 8 and become integral therewith. FIGS. 3b and 3c show other self-evident variations of the junction between the lattice borders 5 and frame 6.

Shoulders 14a and 14b are formed at the junction between the borders 5 of the lattices 8 and the frame 6 and extend completely around the lattice 8. Like mesas, the lattices 8 stand in relief above the faces 9a and 9b of the frame 6, and are sized to nest in complementary-shaped recesses formed in a spacer frame (to be described hereinafter) for aligning and interlocking the several frames together and preventing lateral shifting thereof with respect to each other, and for providing a sufficiently large interfacial area between abutting frames to achieve a good electrolyte seal therebetween.

In the case of a Pb-acid bipolar battery having a septum comprising a lead plate, a porous coating 16 is provided on at least one face 18 of the septum plate 2 before, which coating comprises multiple layers of lead particles 20 fused to each other, and to the face 18, so as to define a plurality of interconnecting interstitial pores 22 therebetween. This coating is preferably formed by arc-spraying a plurality of molten lead droplets onto the face 18 of the plate 2 as described in U.S. Ser. No. 079,030 (supra) assigned to the assignee of the present application.

For the preferred embodiment shown in FIG. 2, the septum plate 2 is placed in an appropriate mold, and a plastic (e.g., thermoplastic or thermoset) injected thereabout to concurrently form the frame 6 and lattice 8 in a single "insert-molding" operation.

Following mounting in the frame/lattices, an active material 24 having a first polarity, and an active material 26 having a second polarity is spread into the pockets 10 of the lattices 8, and in the case of a Pb-acid battery, pressed into the coating 16 so as to impregnate the pores 22 thereof sufficiently to anchor the active material thereto.

Figure 6:
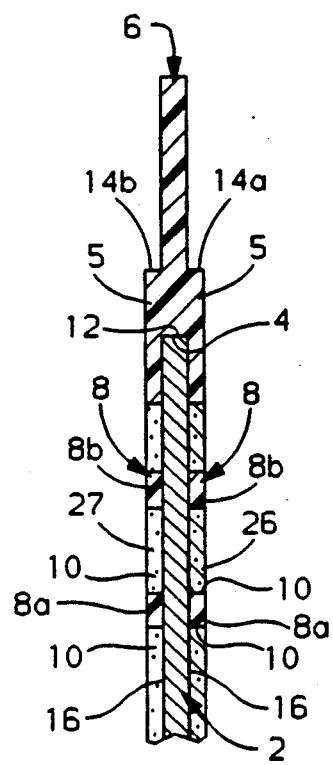
FIG. 6 is a view like FIG. 5, but with active material pasted on only one face of the electrode to form a monopolar electrode.

As best shown in FIG. 6, one of the "bipolar" electrodes described above may be used as a monopolar electrode (i.e., for use in the end cells of the battery) by pasting only one face thereof with active material paste 26. In the end cell, the pasted side 26 will confront an opposite polarity face of any adjacent bipolar electrolyte, while the unpasted face 27 will confront the end wall 44 of the battery. At one end of the battery, the active material paste on the monopolar electrode will comprise positive active material, and at the other end of the battery, the active material paste on the monopolar electrode will comprise negative active material. Alternatively, conventional pasted, grid-type monopolar electrodes mounted in an appropriate frame may be used as the monopolar electrodes in the end cells.

Figure 7:
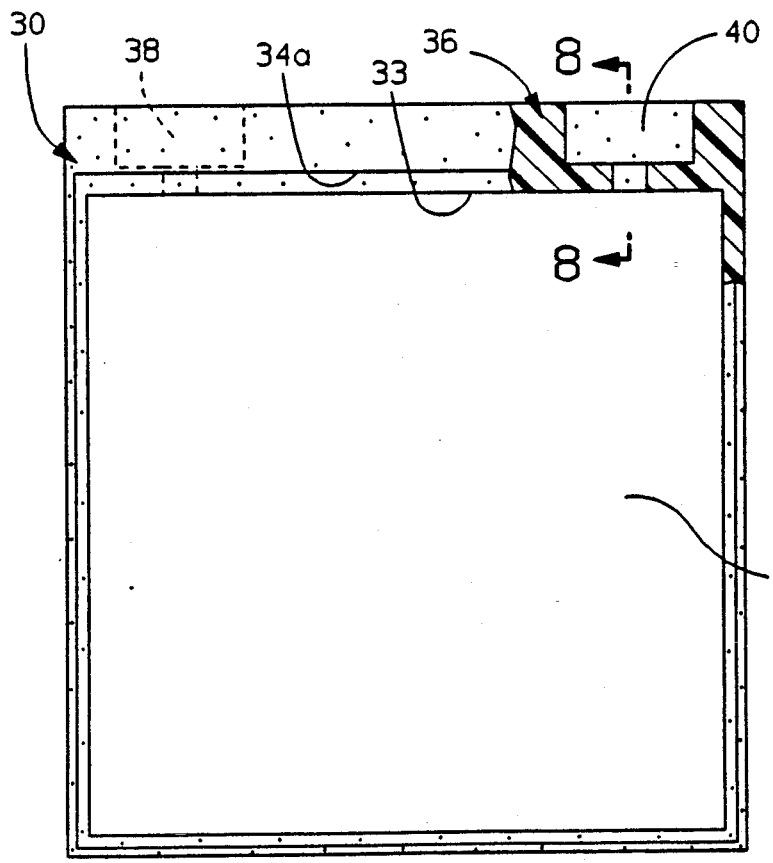
FIG. 7 is a partially sectioned, front, elevational view of a interelectrode, spacing frame.
Figure 8:
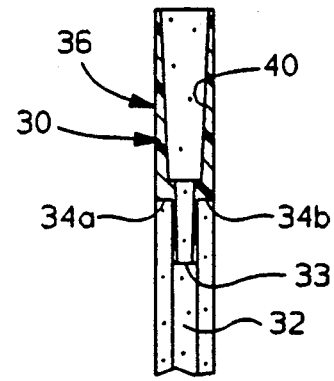
FIG. 8 is a view in the direction 8—8 of FIG. 7.

FIGS. 7 and 8 depict a spacer frame 30 which, in the finished battery, serves to space one bipolar electrode 2 from the next adjacent electrode (i.e., bipolar or monopolar) in the stack, and to define a region 32 between opposing faces of the adjacent electrodes for containing the battery's electrolyte and interplate separator (e.g., compressed gas recombinant type glass mat 58 such as described in U.S. Pat. No. 3,862,861). For convenience of handling and assembly, it is desirable to mold/embed the edges of the separator (e.g., glass mat 58) directly into the frame 30, (not shown). The spacer frame 30 contains annular recesses 34a and 34b formed in the faces thereof and contiguous the inner rim 33 which recesses are sized to receive, in nesting fashion, the shoulders 14a and 14b surrounding the mesa-like lattices 8. The upper legs 36 of each of the spacer frames 30 include openings 38 and 40 for admitting electrolyte into the regions 32 and/or for venting the cells as may be required after the cell stack has been assembled. A single such opening may be used in lieu of two openings.

Figure 9:
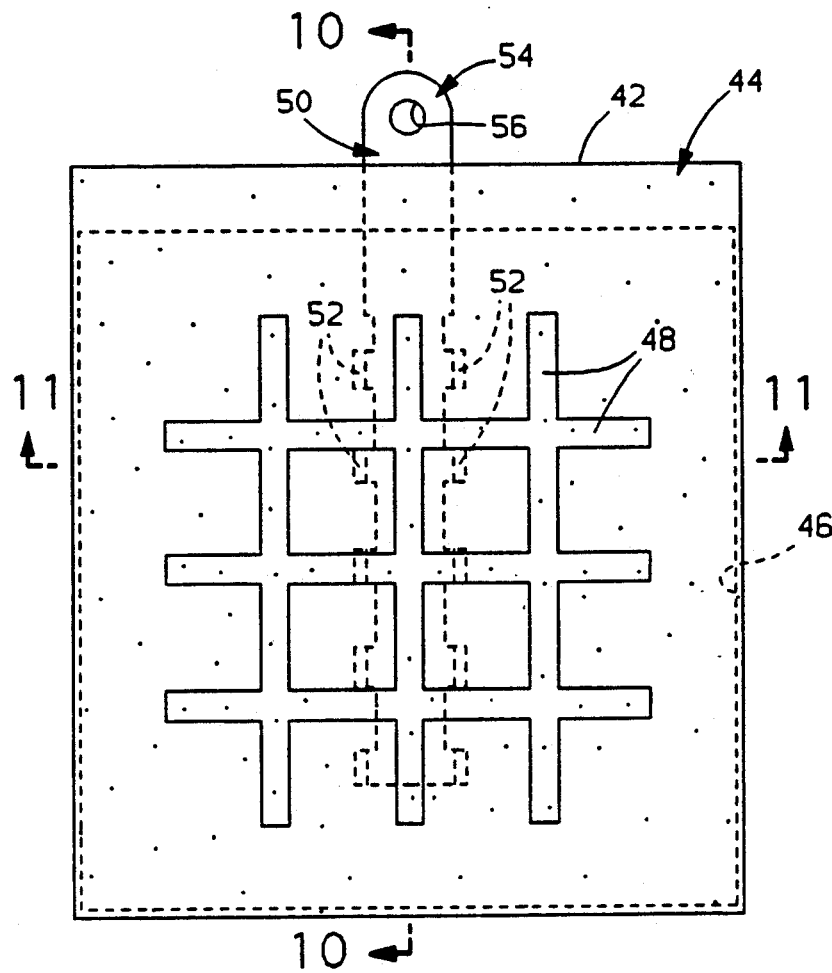
FIG. 9 is a front elevational view of an end wall of a bipolar battery.
Figure 10:
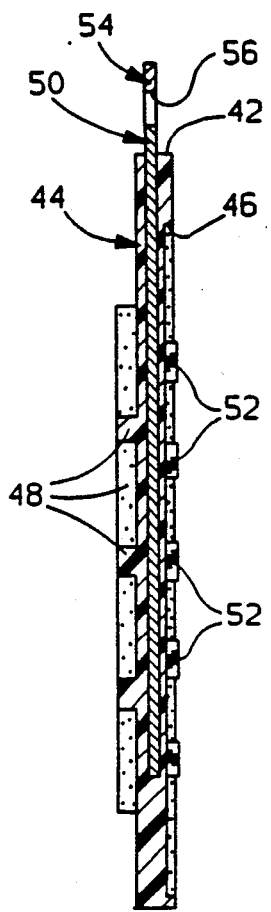
FIG. 10 is a view in the direction 10—10 of FIG. 9.
Figure 11:
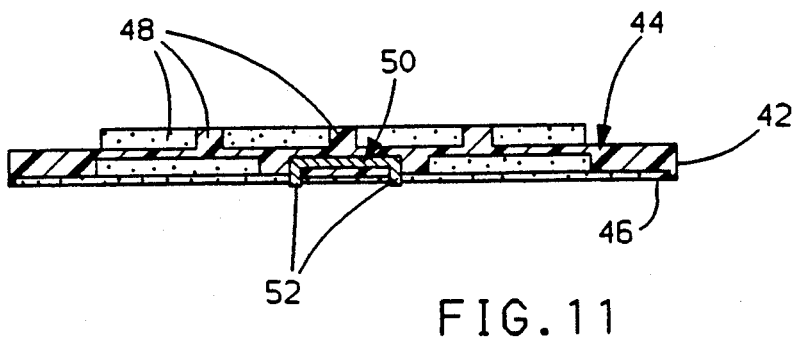
FIG. 11 is a view in the direction 11—11 of FIG. 9.

FIGS. 9-11 depict an end wall 44 of a bipolar electrode stack. The wall 44 comprises a nonconductive (e.g., thermoplastic or thermoset plastic) material having an annular recess 46 therein adapted to receive a shoulder 14a or 14b on one of the monopolar electrodes discussed above (see FIG. 6). A plurality of crisscrossing ribs 48 on the outside of the wall 44, opposite the recess 46, stiffen the end wall 44 and prevent bulging thereof. A metal blade 50 having a plurality of tangs 52 projecting outwardly therefrom into the end cell of the battery, is insert-molded into the wall 44 and extends beyond the peripheral edge 42 thereof to form a terminal 54 for the battery. The terminal 54 has an appropriate aperture 56 adapted to receive a bolt, or the like, for connecting to an external electrical circuit. The tangs 52 projecting from the blade 50 extend into contact with the unpasted face of the septum plate 2 and are induction welded thereto after the stack has been assembled. The blade 50 will preferably comprise Sn-coated or Pb/Sn-coated copper wherein the Sn or Pb/Sn coating promotes bonding to the plastic forming the wall 44, and facilitates induction welding of the septum plate 2. Any conductive, corrosion-resisted metal, e.g., titanium, can be used in place of copper.

Figure 14:
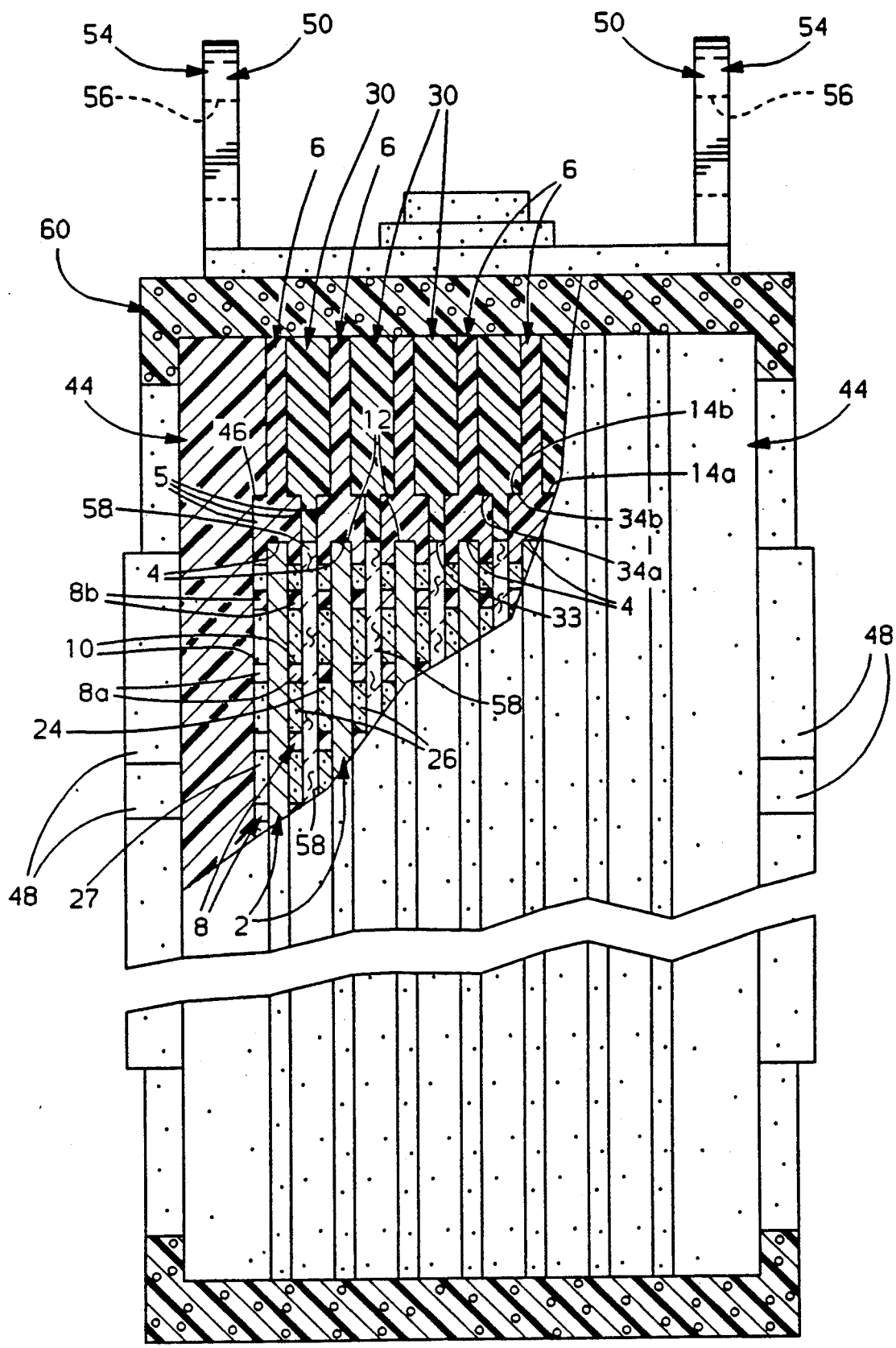
FIG. 14 is a sectioned, side view in the direction 14—14 of FIG. 13.

FIGS. 12-14 show a preferred embodiment of a bipolar electrode stack before and after encasement in a separate housing. FIG. 12 shows how the end walls 44 and the several electrode and spacer frames nest one within the other to form a bipolar electrode stack. When fully nested within the spacer frames, the electrode frames 4 abut, face-to-face, the spacer frames 30 providing a relatively high interfacial sealing area therebetween and a tortuous path for electrolyte attempting to escape from the electrolyte region 32 via the interface between frames. FIG. 12 also shows a microporous glass mat separator 58 positioned within the spacer frame 30.

In accordance with a most preferred embodiment, the assembled stack is positioned in an appropriate mold and molten plastic (e.g., thermoplastic or thermoset) injected thereabout to form an outer housing 60 which embeds the several frames, holds them together (see FIG. 13) in leak-tight fashion and shapes the outer surface of the housing. The injected plastic will preferably contain about 20% by weight of a foaming agent (e.g., F-CL Foaming Agent sold by Wilson Fiberfill International) and is injected under low pressure about the stack. At temperatures in excess of 350° F. the foaming agent produces CO, $CO_2$ and ammoniacal foaming gases which expand and foam the plastic to completely fill the mold cavity without subjecting the stack to the high injection molding pressures otherwise required to fill out the mold cavity. Alternatively, the frames may be clamped together, or sealingly bonded (i.e., glued) one to the next to form the outer case/housing from the frames themselves.

While the invention has been disclosed primarily in terms of specific embodiments thereof it is not intended to be limited thereto, but rather only to the extent set forth hereafter in the claims which follow.

The embodiments of the invention in which an exclusive property or privilege is claimed are defined as follows.

1. In a bipolar battery comprising a stack of bipolar electrodes each comprising a substantially planar, electrolyte-impervious, electrically conductive septum having a positive polarity face and a negative polarity face on opposite sides thereof, and a monopolar electrode at each end of said stack, the improvement comprising:
   a nonconductive electrode frame engaging the periphery of each of said bipolar electrodes;
   a pair of mesa-like, nonconductive lattices integral with and on opposite sides of said electrode frame, said lattices each laying inboard the periphery of, and standing in relief from, said electrode frame so as to overlay and provide a plurality of pockets extending across said face,
   a shoulder formed between said frame and said lattice and surrounding said lattice;
   active material filling said pockets;
   discrete spacer frames interjacent said electrode frames for spacing said electrodes from each other, said spacer frames each having a pair of faces on opposite sides thereof confronting said electrode frames, and an internal rim defining an electrolyte retention region between adjacent electrodes in said stack;
   an annular recess in each of said faces contiguous said rim receiving a said shoulder such that a said lattice nests within said spacer frame; and
   terminal means engaging said monopolar electrodes for electrically connecting said battery to external electrical circuitry.

2. A battery according to claim 1 wherein said frames are sealed one to the other forming a housing for the battery.

3. A battery according to claim 1 wherein said stack is contained in a separate housing.

4. A battery according to claim 1 wherein said terminal comprises a metal blade embedded in an end wall of the stack, said blade having at least one tang projecting out of said end wall and fused to a said monopolar electrode.

5. A battery according to claim 4 wherein said monopolar electrode comprises a conductive metal plate having active material on only one face thereof and said tang is fused to the opposite face thereof.

6. A battery according to claim 5 wherein said tang is fused to said opposite face by induction welding after said stack has been formed.

7. A battery according to claim 1 wherein said spacer frame embeds the peripheral edges of a microporous, dendrite suppressing, interelectrode separator positioned in said region.

8. A battery according to claim 1 wherein said spacer frame has at least one opening therein for admitting electrolyte into said region.

9. A battery according to claim 1 wherein said spacer frame has at least one opening therein for venting gases from said region.

* * * * *